(12) United States Patent
Takiguchi (10) Patent No.: US 7,443,525 B2
(45) Date of Patent: Oct. 28, 2008

(54) IMAGE DATA PROCESSING METHOD, IMAGE SCANNING APPARATUS, POS TERMINAL, AND ELECTRONIC PAYMENT SYSTEM

(75) Inventor: Yuji Takiguchi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1030 days.

(21) Appl. No.: 10/465,705

(22) Filed: Jun. 19, 2003

(65) Prior Publication Data

US 2004/0061913 A1 Apr. 1, 2004

(30) Foreign Application Priority Data

Jun. 21, 2002 (JP) ............................ 2002-182153

(51) Int. Cl.
*G06K 15/00* (2006.01)
*G06K 1/00* (2006.01)

(52) U.S. Cl. ..................... 358/1.15; 358/474; 358/1.16; 358/524; 382/137

(58) Field of Classification Search ................. 358/474, 358/1.15, 1.16, 501, 505, 404, 401, 405, 358/524; 382/135, 137–140
See application file for complete search history.

(56) References Cited

U.S. PATENT DOCUMENTS

| | | | | |
|---|---|---|---|---|
| 5,854,581 A | * | 12/1998 | Mori et al. | 235/379 |
| 6,078,399 A | * | 6/2000 | Kadota | 358/1.13 |
| 6,388,758 B2 | * | 5/2002 | Kawanabe et al. | 358/1.13 |
| 6,429,947 B1 | * | 8/2002 | Laverty et al. | 358/1.15 |
| 6,470,099 B1 | * | 10/2002 | Dowdy et al. | 382/287 |
| 6,615,194 B1 | * | 9/2003 | Deutsch et al. | 705/75 |
| 6,850,653 B2 | | 2/2005 | Abe | |
| 6,934,058 B2 | * | 8/2005 | Kageyama et al. | 358/497 |
| 7,000,828 B2 | * | 2/2006 | Jones | 235/379 |
| 7,246,158 B2 | * | 7/2007 | Kitada et al. | 709/219 |
| 2002/0191213 A1 | * | 12/2002 | Laverty et al. | 358/1.15 |
| 2005/0078333 A1 | * | 4/2005 | Kobako et al. | 358/1.15 |

FOREIGN PATENT DOCUMENTS

| | | |
|---|---|---|
| JP | 10-013581 | 1/1998 |
| JP | 11-313182 | 11/1999 |
| JP | 2000-280579 | 10/2000 |
| JP | 2000-330744 | 11/2000 |
| JP | 2001-016374 | 1/2001 |
| JP | 2002-057822 | 2/2002 |
| JP | 2002-077501 | 3/2002 |
| JP | 2002-099496 | 4/2002 |
| JP | 2003-18348 | 1/2003 |

\* cited by examiner

*Primary Examiner*—Edward L. Coles
*Assistant Examiner*—Negussie Worku
(74) *Attorney, Agent, or Firm*—Seiko Epson Corporation (57) ABSTRACT

Image data is processed appropriately even when there is a problem with a storage component of an image scanning apparatus. The image scanning apparatus acquires image data and stores it in local storage memory, and sends a storage result report to a terminal computer. Based on this storage result report the terminal computer determines the image data processing method. The image scanning apparatus then processes the image data according to the method determined by the terminal computer.

16 Claims, 10 Drawing Sheets

(a) After scanning (b) After uploading

IMAGE DATA PROCESSING METHOD, IMAGE SCANNING APPARATUS, POS TERMINAL, AND ELECTRONIC PAYMENT SYSTEM

BACKGROUND OF THE INVENTION

1. Field of the Invention

The present invention relates to a method for processing image data acquired by an image scanning apparatus according to instructions from a host computer, to an image scanning apparatus, a point-of-sale (POS) terminal, and an electronic payment system.

2. Description of the Related Art

Figure 9:
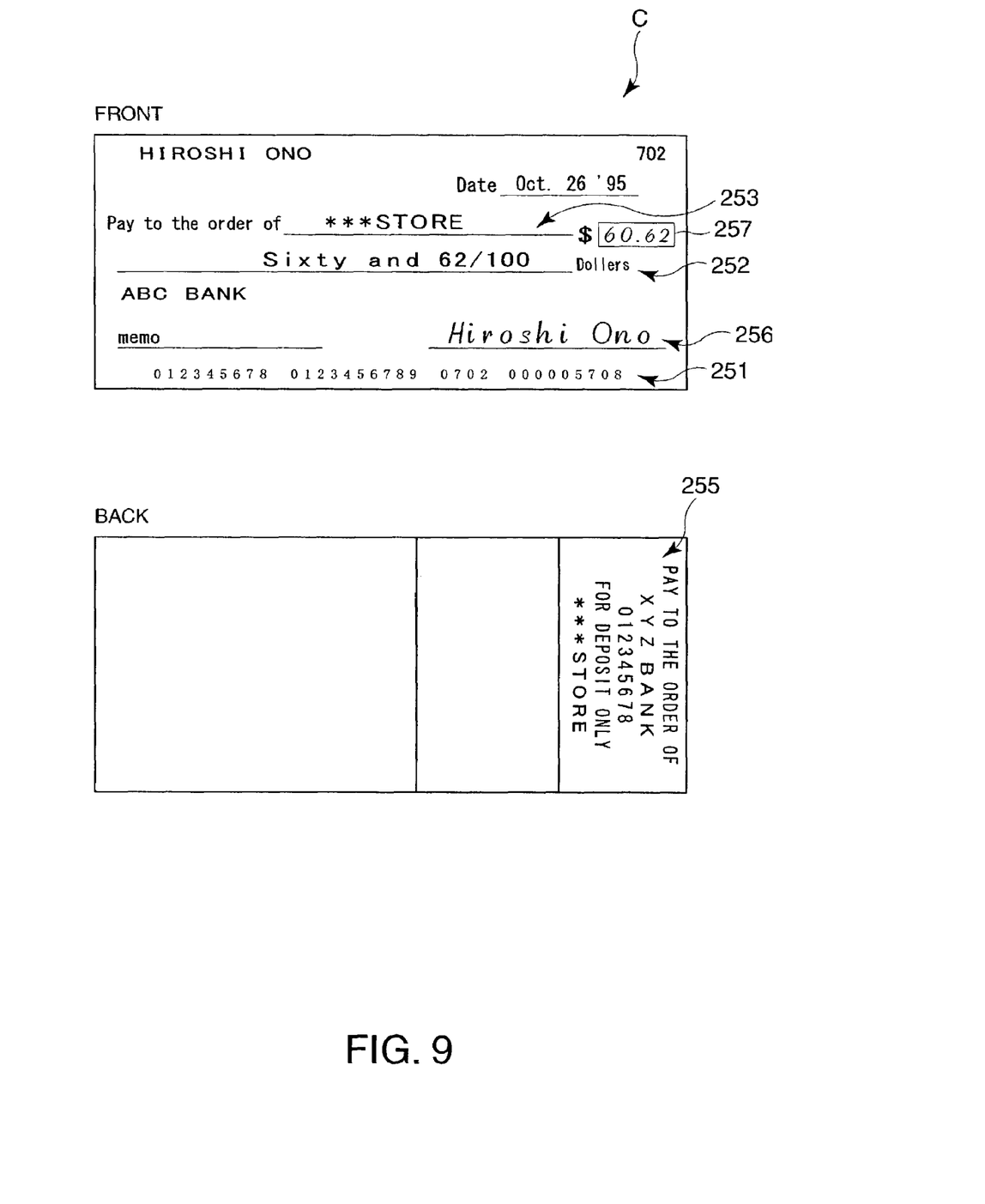
FIG. 9 shows a typical check scanned by an image scanning apparatus according to the prior art.

Paying for purchases using a personal check, such as that shown in FIG. 9, is common practice in the United States. Electronic payment systems that digitize check Clearing process are able to complete the check-clearing process more quickly and securely by scanning each check and sending the scanned image over a network to a clearing house.

Figure 10:
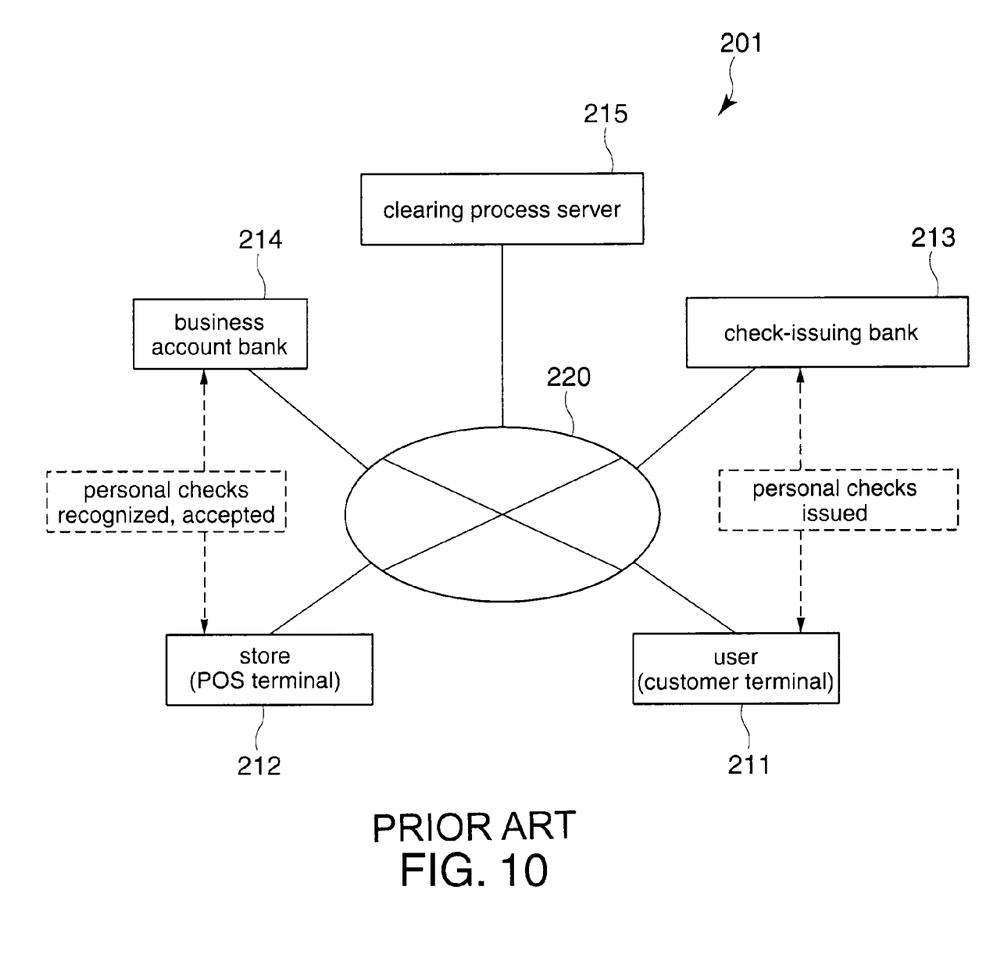
FIG. 10 is a schematic diagram of an electronic payment system according to the prior art.

As shown in FIG. 10 an electronic payment system 201 involves a user 211 that writes a check C, a store (POS terminal) 212 where check C is used, a check-issuing bank 213 where the user 211 has an account on which check C is written, a business account bank 214 where the store 212 has an account, and a clearing process server 215 that handles check C clearing process. The clearing process server 215 is connected to the customer terminal of user 211, the POS terminal of store 212, check-issuing bank 213, and business account bank 214 over a network 220.

Using a check C starts with the user 211 writing and presenting a check C to the store 212 to pay for a purchase. As shown in FIG. 9 user-specific information 251 printed in magnetic ink on the face of check C includes a bank code and a user account number by which the user 211 can be identified. The store 212 can determine whether check C is valid by scanning this user-specific information 251 with a MICR reader. To actually determine if check C is valid, the information captured from the MICR scan is sent by the store to the clearing process server 215, which determines the validity of check C and returns the result to the store 212.

If check C is confirmed valid, the operator (e.g., the checkout clerk) prints the transaction amount 252 and store information 253 on the check face, prints an endorsement 255 on the back of the check, and then obtains the user's signature 256. The store 212 then scans the completed check C with a scanner, stores the captured image data together with the user-specific information 251 acquired by the MICR head, amount 252, and store information 253 in the terminal computer (POS terminal), and sends the same information to the clearing process server 215.

Based on the received image data, user-specific information 251, amount 252, and store information 253, the clearing process server 215 completes the financial transaction (transfer) between the business account bank 214 and check-issuing bank 213. The clearing process server 215 also sends the image data to the user 211 and reports the result of the payment process. Because this electronic payment system 201 sends and receives image data, it is not necessary to transport the physical check; thus, the payment process can be completed quickly and securely.

The problem with deploying this electronic payment system 201 in every store, however, is the environment of the terminal computer (POS terminal) that stores and manages the image data. More specifically, the image data is sent to and stored in the terminal computer after it is acquired by the scanner, but if the terminal computer has a low speed interface it can take a long time to send and store the image data. It is obviously possible to lower the image resolution and thereby reduce the data size of the image and shorten the time needed to send and store the image data. However, text is blurred when the image resolution is reduced, thereby reducing the usefulness of the image data as proof of check usage.

One method of getting around this problem is to provide the scanner with storage capacity for storing the acquired image data locally in the scanner, and then later transferring the image data from the scanner to the terminal computer during terminal computer idle time. While this method solves the problem of the data transmission time from the scanner to the terminal computer, it has certain disadvantages in that additional problems may arise. If the remaining storage capacity of the storage medium in the scanner is low, it may be necessary to rescan check C after pausing to download data from the scanner storage means to the terminal computer. A further problem is that a malfunction of the storage medium requires processing to stop.

OBJECT OF THE INVENTION

An object of the present invention is therefore to solve these problems by providing an image data processing method capable of appropriately processing data even if there is a problem with the storage medium in the scanner, an image scanning apparatus, a POS terminal, and an electronic payment system.

SUMMARY OF THE INVENTION

To achieve this object, an image data processing method according to the present invention processes image data acquired by an image scanning apparatus according to host computer commands. The method includes scanning image data using the image scanning apparatus; attempting to store the image data in a primary storage medium (e.g., flash ROM) in the image scanning apparatus; sending a storage result report from the image scanning apparatus to the host computer, the storage result report being indicative of the result of storing the image data in the primary storage medium; determining by the host computer a processing method based on the received storage result report; and processing the image data using the image scanning apparatus according to the determined processing method.

An image scanning apparatus according to the present invention processes acquired image data according to host computer commands. The image scanning apparatus includes a scanner for acquiring image data; a primary storage medium for storing the image data; a transmitting unit for sending to the host computer a storage result report indicative of the result of storing the image data in the primary storage medium; and a processing unit for processing the image data according to a processing method or mode determined by the host computer based on the storage result report.

With the invention thus comprised a storage result report indicating the result of storing image data acquired by the image scanning apparatus in a primary storage medium is sent to the host computer, and the image data is then processed according to the processing method determined by the host computer based on the storage result report. The image data can therefore be appropriately processed even when there is a problem with the primary storage medium, including a storage medium failure or lack of storage capacity. It should be noted here that this "primary storage medium" does not refer to the main memory used to store data and programs in the computer, but refers instead to a storage medium for storing image data acquired by the image scanning apparatus.

The storage result report preferably includes information indicating whether the image data was stored successfully in the primary storage medium. This enables the host computer to determine the subsequent image data processing method accordingly.

Further preferably in this case, if a storage result report indicating that the image data was stored successfully is received, the processing method determined by the host computer includes a method for completing the transaction.

Further preferably in this case, if a storage result report indicating that the image data was stored successfully is received, the processing method determined by the host computer includes a method for sending the image data stored in the primary storage medium to the host computer. When thus comprised the image data can be stored successfully to the primary storage medium and the same image data can be sent to the host computer.

Yet further preferably, the image scanning apparatus includes a temporary storage medium (e.g., RAM) for temporarily storing the acquired image data before attempting to store it in the primary storage medium. When a storage result report indicating that the image data was not stored successfully is received, the processing method determined by the host computer includes a method for sending the image data stored in the temporary storage medium directly to the host computer without storing the image data in the primary storage medium.

When thus comprised the image data stored in the temporary storage medium can be sent directly to the host computer when it cannot be stored successfully in the primary storage medium. The image data can therefore be sent reliably to the host computer even when there is a problem with the primary storage medium.

Yet further preferably, when a storage result report indicating that the image data was not stored successfully is received, the processing method determined by the host computer includes a method for terminating the transaction. This enables the transaction to be unconditionally terminated when the image data cannot be stored successfully in the primary storage medium and the host computer cannot find an alternative solution.

Yet further preferably, the storage result report includes information relating to the size of the stored image data.

Yet further preferably, the image data processing method also includes presenting the storage result report. In this regard, the image scanning apparatus may include an indicator or display device for presenting the storage result report.

These configurations enable the storage result report to be presented to the user by means of a simple device configuration and in a user-friendly manner and to enable the user to easily understand the storage result report, specifically whether image data was stored correctly and the size of the stored image data. The display size and type may be selected so as to provide an appropriate level of detail.

Yet further preferably, the image scanning apparatus and host computer are connected by a connector. This enables the image scanning apparatus and host computer to be easily connected.

A POS terminal according to the present invention includes an image scanning apparatus as described above, and a terminal computer functioning as the host computer. Thus comprised the POS terminal can appropriately process image data, preferably acquired from a check, even when there is a problem with the primary storage medium of the image scanning apparatus, including a storage medium failure or lack of storage capacity.

Further preferably the POS terminal also includes a user-specific information reader for acquiring user-specific information preprinted on the check; and a transmitter for sending the acquired user-specific information to the terminal computer. The terminal computer stores the sent image data and the user-specific information acquired from the image data linked to each other for easy retrieval.

Thus comprised the user-specific information preprinted to the check is read by the user-specific information reader and sent to the host computer. This eliminates the need for the operator to manually input the user-specific information, and eliminates management errors (such as assigning the wrong ID number) due to data entry errors by the operator. Furthermore, because the terminal computer stores the sent image data with a specific relation to the user-specific information captured from the image data, inquiries from the user after a check is used can be answered quickly, and data management is made easier.

The terminal computer in this case preferably has an input device for inputting amount information and store information for printing on the check. This enables the amount information and store information printed to each check to be entered automatically, thereby eliminating the need for manual input.

An electronic payment system according to the present invention includes a POS terminal as described above, a customer terminal used by a check user, and a clearing process server connected through a network to the POS terminal and customer terminal for executing and managing a check payment clearing process. An electronic payment system thus comprised can appropriately process image data even when there is a problem with the primary storage medium, including a storage medium failure or lack of storage capacity, in the image scanning apparatus of the POS terminal.

The POS terminal preferably sends check information to the clearing process server, the check information containing correlated user-specific information, amount information, store information, and image data.

All information, specifically the user-specific information, amount information, store information, and image data, required for the check clearing process is thus uniquely related and sent to the clearing process server as the check information. The clearing process server can therefore quickly process the check based on this check information.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of an image data processing method, image scanning apparatus, POS terminal, and electronic payment system according to the present invention are described below with reference to the accompanying figures.

An image scanning apparatus (scanner) according to the present invention includes an internal storage medium (e.g., flash ROM) for temporarily storing captured image data which is later transferred to a host computer (terminal computer) during host idle time. Image scanning can therefore be done quickly even using a low performance host computer and interface, and data can also be transferred reliably.

As a result, an electronic payment system that clears check payments without handling the actual physical checks by transmitting check image data acquired by the scanner from a check C (personal check, bank check, or other similar instrument) can therefore be used without being dependent upon the terminal computer environment.

Storage result information indicative of whether the image data acquired by the scanner was successfully stored in the storage medium is sent by the scanner to the terminal computer. Based on this storage result information, the terminal computer then processes the image data according to a specified method. As a result, the image data can be appropriately processed even if a problem, such as a storage medium error or insufficient storage capacity, occurs with the storage medium.

The present invention is described in further detail below using by way of example a POS terminal such as used in restaurants and retail stores, and a hybrid processing apparatus used in conjunction therewith. The hybrid processing apparatus used in this example combines the functions of an image scanning apparatus, magnetic ink character reader (MICR) and printer (each designed for processing checks), and a receipt printer. An electronic payment system having this POS terminal is also described below.

Figure 1:
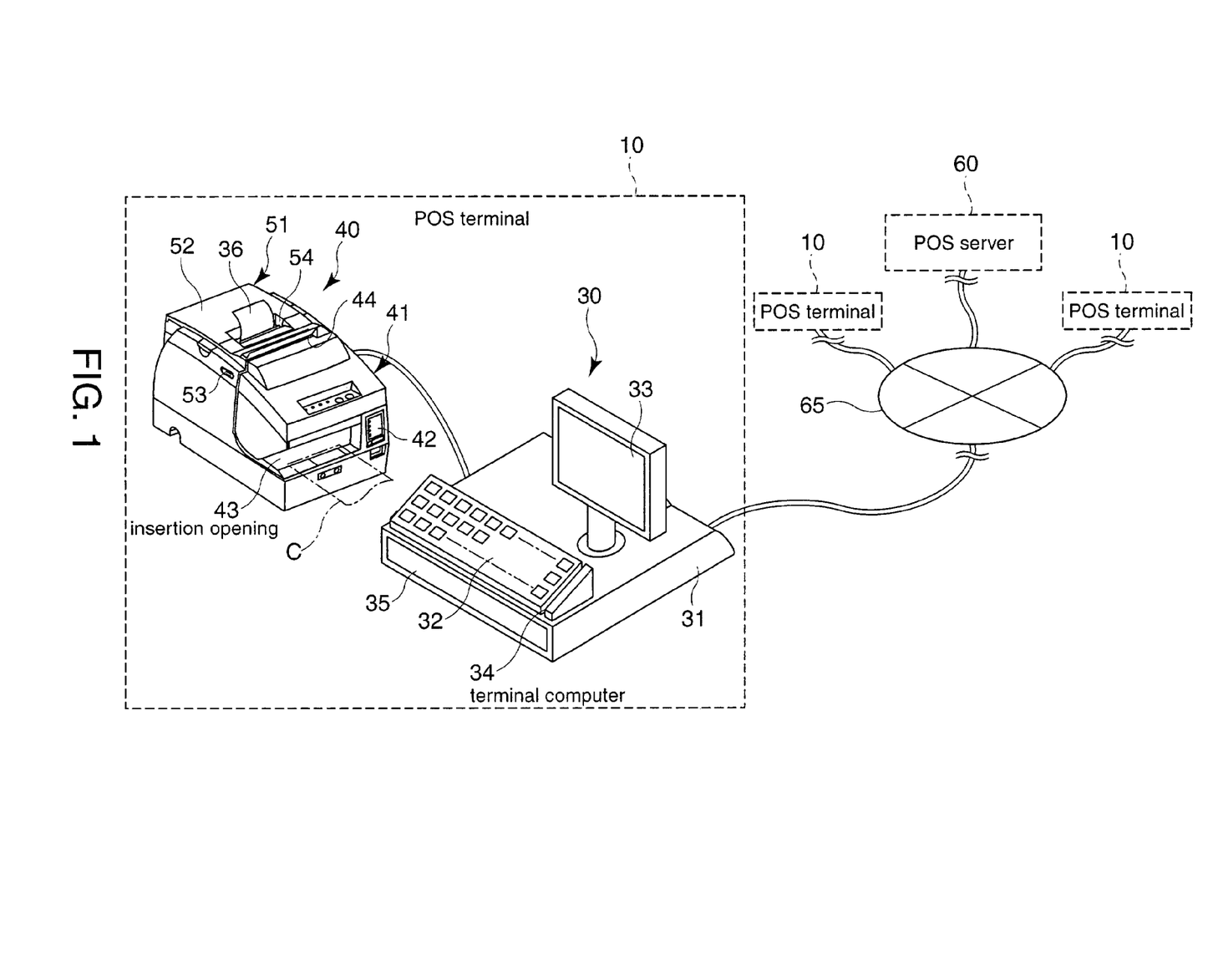
FIG. 1 is an external oblique view of a POS terminal configured according to embodiments of the present invention.

As shown in FIG. 1, a PO terminal 10 according to this embodiment of the invention includes a terminal (host) computer 30 for calculating a transaction amount based on price information input by an operator, and a hybrid processing apparatus 40 for performing various check processing operations.

The terminal computer 30 has a case 31, keyboard 32 for entering data (product codes and price information, for example) a display 33 for displaying the product and price information, a card reader 34 for reading a credit card, preferred customer card, or other magnetic stripe card, and a cash drawer 35 for holding cash and other payment instruments. The terminal computer 30 is connected to a POS server 60 over a network 65.

Multiple POS terminals may be connected to the POS server, which manages information input to such terminals. More specifically, the POS server 60 acquires input to each POS terminal 10 and based thereon extracts information relating to product names and prices stored in the POS server 60. From the extracted information the POS server 60 then generates product data used for display on the display 33 and printing to a receipt 36, and returns the result to the POS terminal 10. Based on the product data sent from the POS server 60, the POS terminal 10 passes the print data for printing to the receipt 36 to the hybrid processing apparatus 40, and generates product information for presentation on the display 33.

The hybrid processing apparatus 40 is in wired or wireless communication with the terminal computer 30 and has an outside cover 41 made of plastic. The outside cover. 41 has an insertion opening 43 at the front for manually inserting a check C in a substantially horizontal orientation, and has a top exit opening 44 from which check C is ejected. The top back part of the outside cover 41 forms a maintenance cover 52. When a slidable lock button 53 disposed on a top side part of the outside cover 41 is appropriately operated, the maintenance cover 52 can be opened upwardly pivoting at the back end part thereof.

As noted above the hybrid processing apparatus 40 functions as an image scanning apparatus 140, MICR 130, and printer 120 (see FIG. 3) so that various check processing operations can be performed by a single unit. These check processing operations include scanning checks, reading user-specific information (i.e., the MICR code 251) preprinted on each check, and printing amount 252 and store information 253 on each check (see FIG. 9). A POS terminal 10 for processing checks can therefore be achieved by simply connecting this hybrid processing apparatus 40 to a terminal computer 30.

The hybrid processing apparatus 40 also has at the back thereof a receipt printing function unit (receipt printer 51) for printing a receipt 36. Also disposed at the back part of the hybrid processing apparatus 40 are a receipt storage part for holding a roll of receipt paper, a receipt printing unit for printing on the receipt paper, and a receipt transportation mechanism for transporting the receipt paper to the receipt printing unit, cutting the paper and ejecting the printed receipt 36 from the receipt exit 54 formed in the top part of the outside cover. Because a typical receipt printer configuration can be used for this receipt printer 51, further detailed description thereof is omitted here and below.

Figure 2:
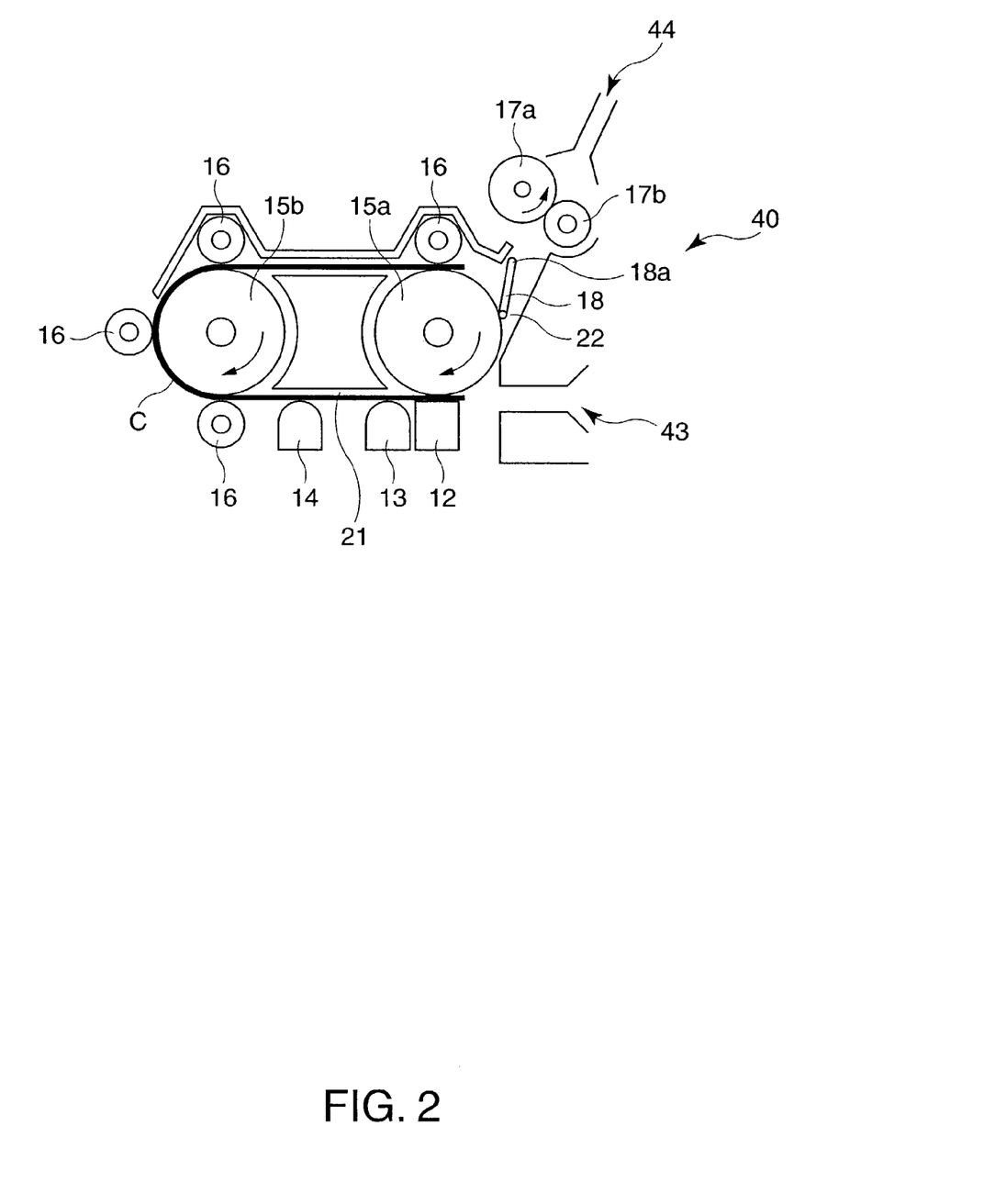
FIG. 2 is a schematic side view of a hybrid processing apparatus including an image scanning apparatus according to embodiments of the present invention.

FIG. 2 is a schematic side view of the inside of the hybrid processing apparatus 40. As shown here the hybrid processing apparatus 40 has a print head 12, magnetic head 13, and scanner 14 disposed along the transportation path 21 near the insertion opening 43, and check C is transported by drive rollers 15*a*, 15*b* and driven rollers 16. It will be obvious that the relative positions and order of the print head 12, magnetic head 13, and scanner 14 are not limited to that shown in FIG. 2.

A diverter 18 and transportation roller pair 17*a*, 17*b* for inverting and returning check C to the transportation path 21 and ejecting check C through the exit opening 44 are disposed near the exit opening 44. As is described in more detail below, check C is inverted for printing and reading the check endorsement on the back of check C (see FIG. 9).

The diverter 18 is normally urged by an urging mechanism (not shown) to a position that opens the return path 22. When the leading edge of a check C transported from the upstream side of the transportation path 21 contacts the diverter 18, its distal end 18a opens and check C is transported toward the exit opening 44. To eject check C the transportation roller pair 17a, 17b normally turns in the forward direction (direction of the arrow) to eject check C from the exit opening 44. To invert and return check C to the transportation path 21, the transportation roller pair 17a, 17b turn in reverse rotation after the trailing end of check C passes the diverter 18, thereby returning the inverted check C through the open return path 22 to the transportation path 21. After check C returned to the transportation path 21 is processed by the print head 12 and scanner 14, it is finally ejected from the exit opening 44.

Figure 3:
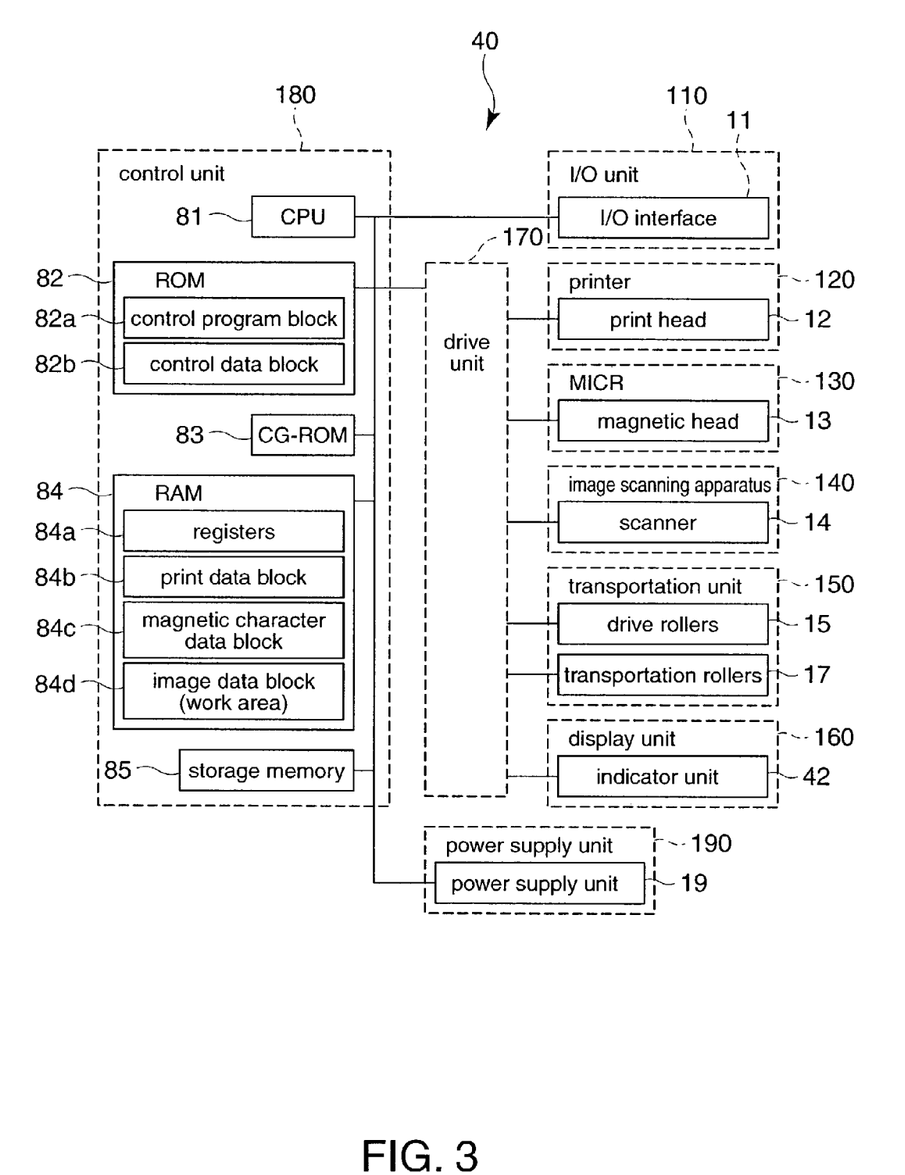
FIG. 3 is a control block diagram of a hybrid processing apparatus including an image scanning apparatus according to embodiments of the present invention.

The control configuration of the hybrid processing apparatus 40 is described next. As shown in FIG. 3, the hybrid processing apparatus 40 has an input/output unit 110, printer 120, MICR unit 130, scanning apparatus 140, transportation unit 150, display unit 160, drive unit 170, control unit 180, and power supply unit 190.

The I/O unit 110 has an input/output interface 11 for inputting print information (amount 252 and store information 253) from the terminal computer 30, and outputting scanned image data. The printer 120 has a print head 12 for printing to a specified part of check C based on input print information. The MICR 130 has a magnetic head 13 for reading the user-specific information 251 preprinted on check C in magnetic ink. The image scanning apparatus 140 has a scanner 14 for capturing images of the front and back of check C. The transportation unit 150 includes drive rollers 15a, 15b and transportation roller pair 17a, 17b for transporting check C. The display unit 160 has an indicator unit 42 for displaying the result of image scanning and storage operations, and errors. The drive unit 170 has one or more drivers for driving the printer 120, MICR 130, image scanning apparatus 140, transportation unit 150, and display unit 160. The control unit 180 controls each of these other parts, and the power supply unit 190 has a power supply unit 19 for supplying electrical power to the other parts.

The control unit 180 has a CPU 81, ROM 82, CG-ROM (character generator ROM) 83, RAM 84, and storage memory 85, preferably in the form of flash ROM, connected to a bus. ROM 82 has a control program block 82a for storing a control program run by the CPU 81, and a control data block 82b for storing control data, including various tables. CG-ROM 83 stores font data for the printed characters, and outputs the corresponding font data for a specific character code applied to the CG-ROM 83.

In addition to various registers 84a for storing information (e.g., different flags), RAM 84 (temporary storage) also has a print data block 84b for storing print data printed by the print head 12, a magnetic character data block 84c for storing magnetic character data read by the magnetic head 13, and an image data block (work area) 84d for temporarily storing image data captured by the scanner 14, and is used as working memory of the control process.

Flash ROM 85 (storage memory or primary storage) stores multiple blocks of image data received from the image data block 84d, and when an erase (delete) command is received from the terminal computer 30 deletes image data by batch or block unit to assure sufficient remaining storage capacity.

Based on the control program stored in ROM 82, the CPU 81 thus comprised accepts signal and data input from other parts of the hybrid processing apparatus 40, processes data in RAM 84, and outputs signals and data to other parts of the hybrid processing apparatus 40 to control operations such as printing to check C, reading magnetic ink character data from check C, and capturing, sending, and deleting check image data.

The processing operation performed on check C is briefly described as follows. When the operator receives a check C from a customer, the operator has the customer sign the check at the signature line 256 (see FIG. 9) and then inserts check C in the insertion opening 43 (see FIG. 2) for check C validation. When a check C is inserted the user-specific information 251 printed in magnetic ink is read and recognized by the magnetic head 13. Note that character recognition could also be done by OCR using the scanner 14.

After character recognition of the user-specific information 251 is finished the information is sent to the terminal computer 30, which passes the information through a network 220 to the clearing process server 215 (see FIG. 10). Whether check C is valid is then determined based on the response from the clearing process server 215. If check C is determined invalid, the drive rollers 15a, 15b are reversed to eject check C from the insertion opening 43. An error message is also indicated on the indicator unit 42 ("Error" indicator L5 in FIG. 7, for example), and an error message indicating that check C is invalid is displayed on the display 33 of the terminal computer 30.

If check C is valid, the operator inputs the amount 252 and store information 253. After the amount 252 and store information 253 have been input, the information is printed to specific locations on the face of check C by the print head 12. When printing the check face is completed the drive rollers 15 and transportation rollers 17 are driven to invert check C and return it to the transportation path 21. When check C is advanced to the print head 12, the print head 12 prints the endorsement 255 at a specific position on the back of the check. It should be noted that the amount 252 does not need to be printed and could be handwritten by the operator or user on the payment amount line 257 of check C (see FIG. 9).

When printing the amount 252 and store information 253 ends, an image of the check face is acquired by the scanner 14. When reading the check face is completed, the drive rollers 15 and transportation rollers 17 are driven to invert check C so that an image of the check back can be captured. The image data is then stored temporarily in image data block 84d, and sent and stored in flash ROM 85. When image scanning ends the drive rollers 15 and transportation rollers 17 are again driven to eject check C from the exit opening 44, completing check processing.

It should be noted that the image data stored in flash ROM 85 is read when a command is received from the terminal computer 30, and is sent to the clearing process server 215 correlated to the relevant check information (i.e., user-specific information 251, amount 252, and store information 253) stored in the terminal computer 30. This is described more fully below.

Image data transmission and processing by the terminal computer 30 and image scanning apparatus 140 (scanner 14) is described next. As shown in the system schematic in FIG. 4, a scan command for scanning the image data is sent from the application 38 of the terminal computer 30 through the interface controller (OS) 39. The identification (ID) number assigned to the scanned image data is also sent.

This identification number is a number that can be easily managed by the terminal computer 30. For example, a value in the 100 range might be assigned to major customers while values in the 500 range are assigned to customers using a particular type of check C. This enables more efficient customer management. The terminal computer 30 sends the assigned ID number to the scanner 14, and stores it in the terminal computer 30 in association with the check information associated with a particular image.

Figure 5:
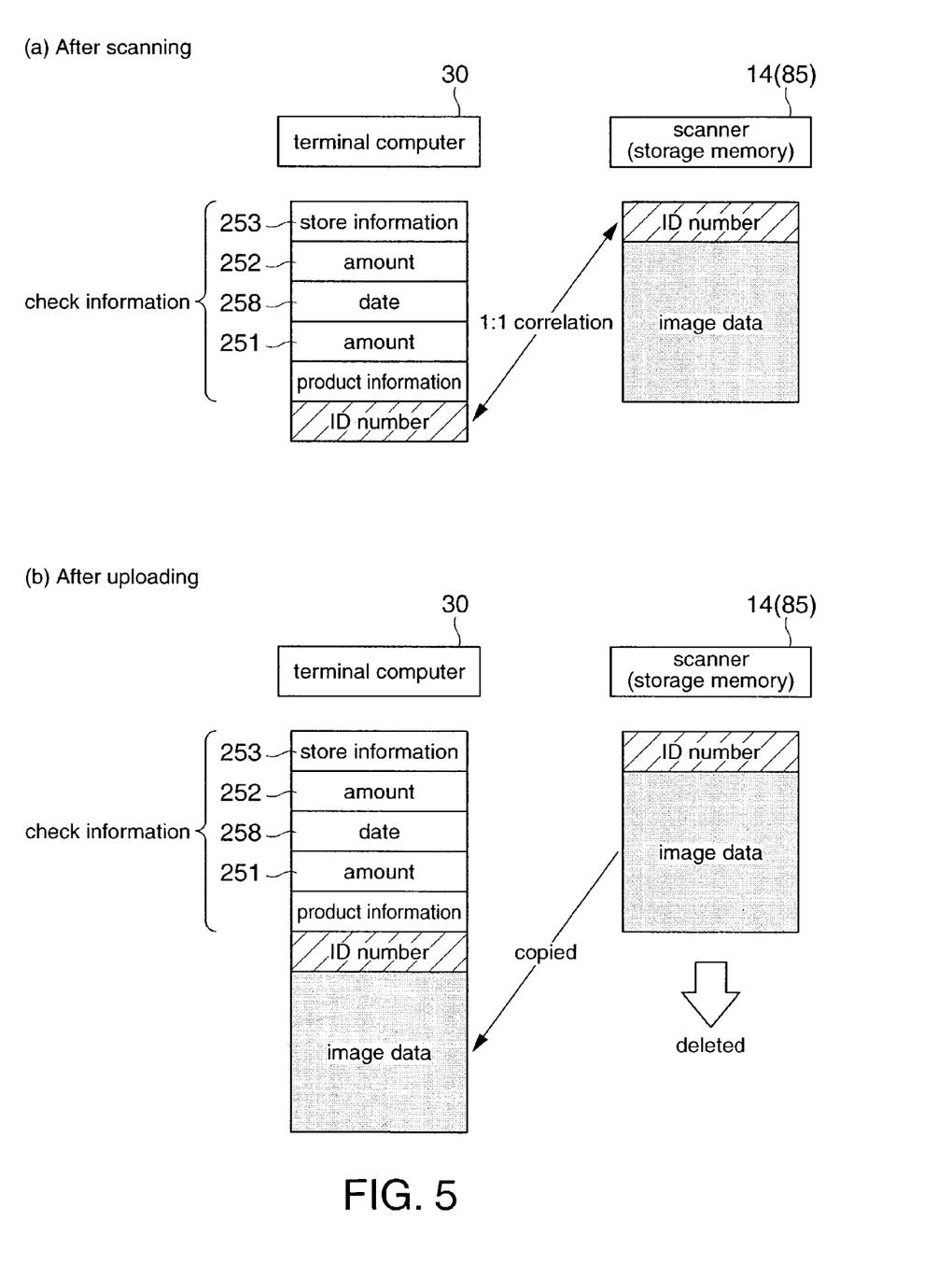
FIG. 5 shows the relationship between an ID number and the check information associated with the image data according to embodiments of the present invention.

As shown in FIG. 5, in addition to the store information 253, amount 252, date 258, and user-specific information 251, this check information includes product information. The store information 253, amount 252, date 258, and product information are based on input to the terminal computer 30 by the operator or information previously stored in the terminal computer 30, and the user-specific information 251 is based on the MICR data captured by the magnetic head 13. The ID number and image data are relationally stored in the scanner 14, specifically in the flash ROM 85 of hybrid processing apparatus 40. In other words, there is a 1:1 relationship between the ID number stored in the terminal computer 30 and the ID number stored in flash ROM 85.

By thus uniquely relating the ID number stored in the terminal computer 30 and the ID number stored in flash ROM 85, image data can be easily and reliably uploaded. Furthermore, because the user-specific information 251 is read by the print head 12, the operator does not need to input the user-specific information 251 to the terminal computer 30, and data management errors (such as assigning the wrong ID number) due to operator input error can be eliminated.

Figure 4:
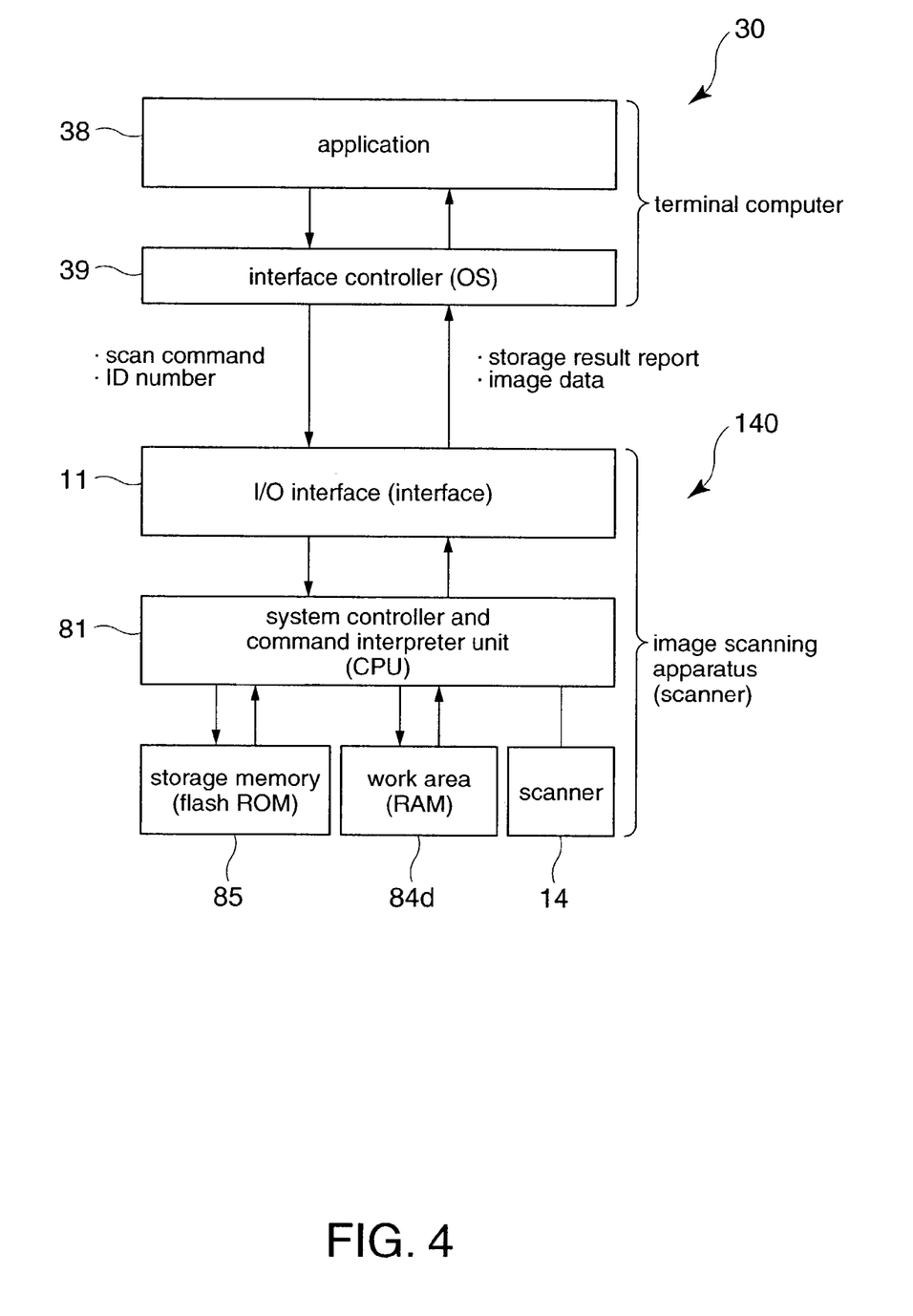
FIG. 4 is a system block diagram illustrating interaction between a terminal computer and an image scanning apparatus according to embodiments of the present invention.

The scan command and ID number sent from the terminal computer 30 are input through the interface controller 11 to the image scanning apparatus 140 as shown in FIG. 4. The scan command is interpreted by the system controller and command interpreter unit (CPU) 81, check C is then scanned by the scanner 14 and image data acquired, and the image data is then stored temporarily to work area 84d (RAM). The captured image data is stored in work area 84d in a data format, such as JPEG or TIFF, specified by the terminal computer 30.

The data format could be preset by the terminal computer 30 and applied to all captured image data, or it could be sent with the scan command such that the data format is specified individually for each image scan. Image data stored to work area (image data block) 84d is stored to storage memory (flash ROM) 85 through the system controller and command interpreter unit (CPU) 81, and the storage result is sent as a storage result report through interface controller (OS) 39 to the application 38. Based on this storage result report the application 38 determines the processing method and instructs the image scanning apparatus 140.

By thus using flash ROM as storage memory 85, image data can be erased and written in batch or block units, and stored data will not be erased even if the power turns off. The capacity of the storage memory 85 in this case is preferably sufficient to store at least all data generated by the number of checks processed by the POS terminal 10 in one day.

The storage result sent to the application 38 includes information relating to whether the image data was stored normally to the storage memory 85, and the size of the image data, thereby enabling the terminal computer 30 to determine the appropriate processing method. The image scanning apparatus 140 interrupts or completes the transaction (process) or uploads the image data to the terminal computer 30 according to the processing method determined by the terminal computer 30.

Uploading the image data is done by the terminal computer 30 specifying the ID number for the uploaded image data, and the image data corresponding to the specified ID number in the storage memory 85 being sent by the terminal computer 30 through the transmission buffer (not shown in the figure) of the RAM 84 and the I/O interface 11. The terminal computer 30 can thus reliably upload desired image data by specifying the ID number. The desired image data can also be easily recognized based on the accompanying check information when the data is uploaded.

By storing the check information, ID number, and image data correlated as shown in FIG. 5(b) after the image data is uploaded, the terminal computer 30 can easily group and sort the image data, user queries received after a check C is used can be quickly answered, and data management is thus easier.

If the image data is stored normally to the storage memory 85, image data must be uploaded from the storage memory 85 to the terminal computer 30. Uploading the image data can be done in response to an upload command from the operator during terminal computer 30 idle time (such as after the store closes), causing, the terminal computer 30 to assert an upload command to the hybrid processing apparatus 40. This enables image data to be transmitted quickly without loading the terminal computer 30 when the POS terminal 10 is busy (such as during normal operation).

The terminal computer 30 could also determine that it is idle when other operations are not performed for a predefined period of time, and assert an upload command to upload the image data. This method eliminates the need for manual uploads by the operator.

The ID number of the uploaded image data is also specified and the image data for the specified ID number is copied and uploaded (see FIG. 5(b)). Because the image data for the specified ID number is copied and sent to the terminal computer 30, data loss in case the image data is damaged during transmission can be avoided. After uploading, the image data that was copied for transmission is deleted so that the storage capacity of the storage memory 85 can be assured.

It should be noted that rather than deleting the copied image data each time it is copied and transferred, it is also possible to batch delete all image data that was copied after all image data is transferred from the storage memory 85. This assures that even if the storage medium of the terminal computer 30 malfunctions before all image data is transferred, data loss can be avoided and sufficient storage capacity can be assured in the storage memory 85 after all image data is transmitted.

Figure 6:
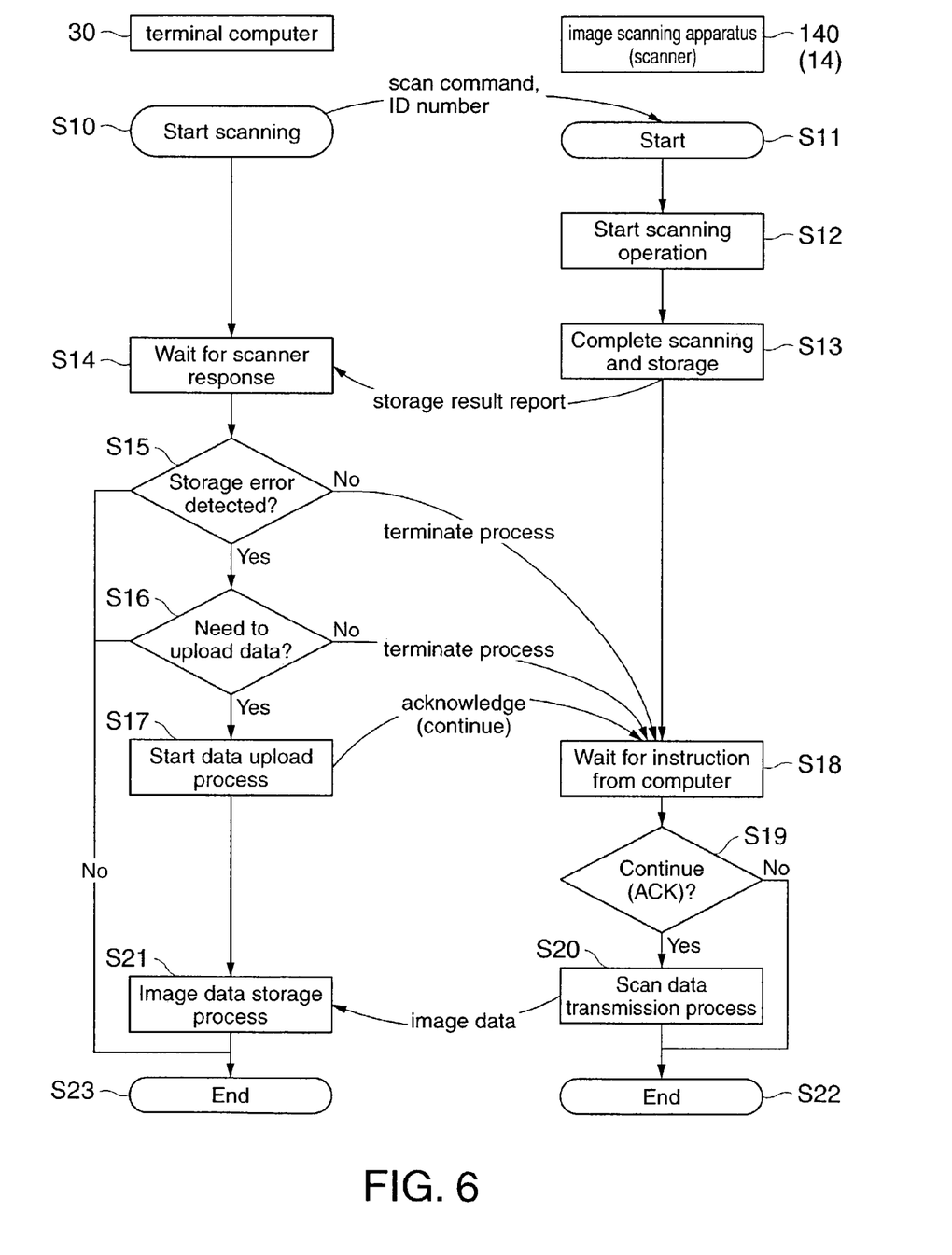
FIG. 6 is a flow chart showing an example of an image data transmission and processing method according to an embodiment of the present invention.

The process executed between the terminal computer 30 and image scanning apparatus 140 (scanner 14) is described next. When the terminal computer 30 starts the check scanning process, it sends a scan command and ID number to the scanner 14 (S10). This causes the scanner 14 to start operating (S11); thus scanning begins (S12). When scanning and storing the image data in the storage memory 85 finish (S13), the storage result report described above is sent to the terminal computer 30.

When the terminal computer 30 receives the storage result report (S14) it determines what to do next based on the content of the report. More specifically, if a storage error is reported (S15 returns yes) because there is insufficient capacity or an error in the flash ROM 85, it is determined whether a data upload is needed (S16). If it is (S16 returns yes), an acknowledge response is returned to the scanner 14 to continue processing (S17).

When the scanner 14 receives this acknowledge response (S18) it is programmed to continue the scanning process (S19 returns yes), and therefore uploads the scanning data (image data) from the work area (RAM) 84 to the terminal computer 30 (20), and ends the process (S22). The terminal computer 30 thus receives and internally stores the image data from the scanner 14 (S21) and then ends the process (S23).

Because image data stored to the work area (image data block) 84d can thus be sent directly to the terminal computer 30 without passing through storage memory (flash ROM) 85, image data can continue to be reliably sent from the scanner 14 to the terminal computer 30 even when there is a problem with the storage memory 85.

Figure 7:
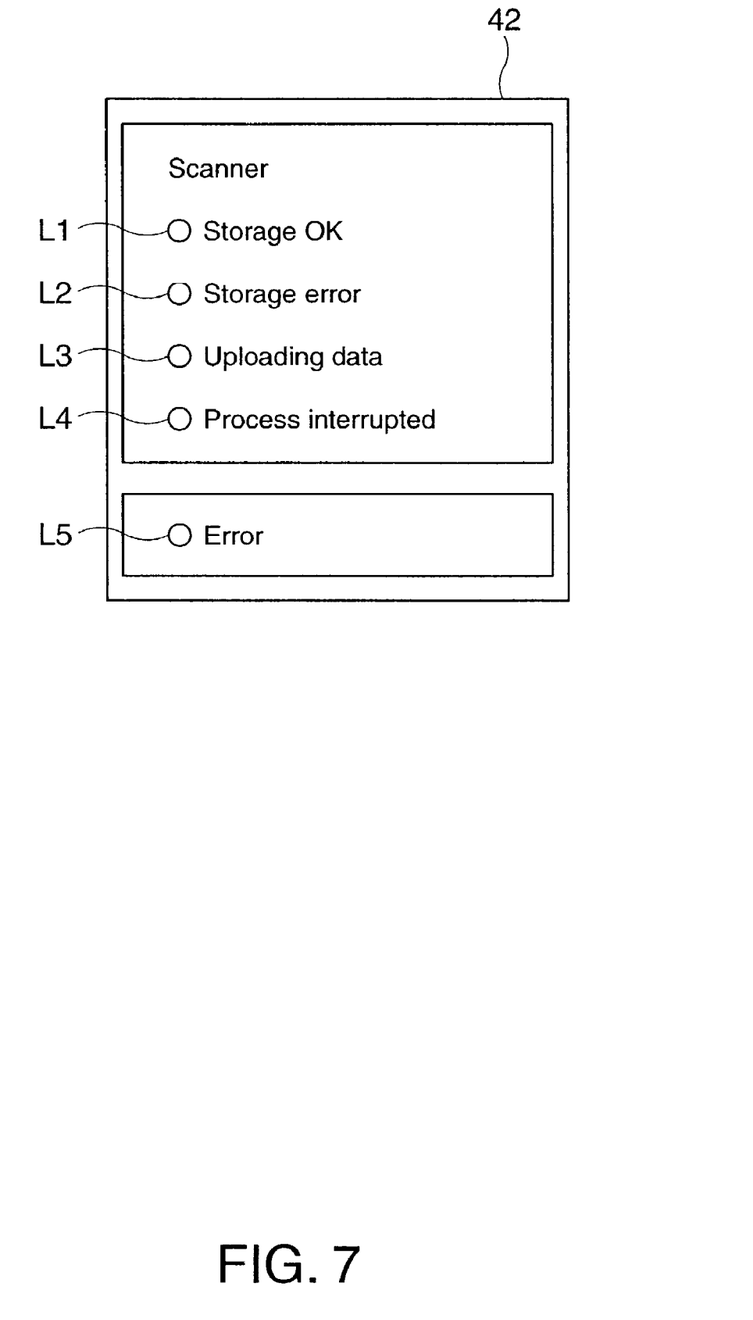
FIG. 7 shows an indicator unit adapted to be disposed in a hybrid processing apparatus including an image scanning apparatus according to embodiments of the present invention.

During the period from when scanning and storing data in storage memory 85 ends (S13) and data uploading ends (S20), the "Storage error" LED (L2) in the indicator group shown in FIG. 7 lights steady, and the "Uploading data" LED (L3) lights steadily during the period from when the acknowledge response is sent (S18) to when data uploading is completed (S20).

If when the storage result report is received (S14) a storage error is not reported (storage was successful and S15 returns no), the terminal computer 30 sends a termination response for ending the process and ends the process (S23). The scanner 14, upon receiving this termination response (S18), is programmed to end the process (S19 returns no). After scanning and storage to the storage memory 85 are completed (S13), the "Storage OK" LED (L1) indicating storage was successful (see FIG. 7) lights steadily for several seconds.

If a storage error that makes continuing the process impossible occurs (such as a mechanical problem or power interruption) (S15 returns yes), the terminal computer 30 knows that uploading data is not needed (S16 returns no). The terminal computer 30 therefore sends a termination response to end (interrupt) the process and aborts further processing (S23). The scanner 14, upon receiving this termination response (S18), is programmed to end the process (S19 returns no). After scanning and storage to the storage memory 85 are completed (S13), the "Storage error" LED (L2) and "Process interrupted" LED (L4) indicating processing was terminated (see FIG. 7) light steady for several seconds. An audible alarm such as a beep could also be sounded in this case to tell the operator that processing ended due to an error.

Figure 8:
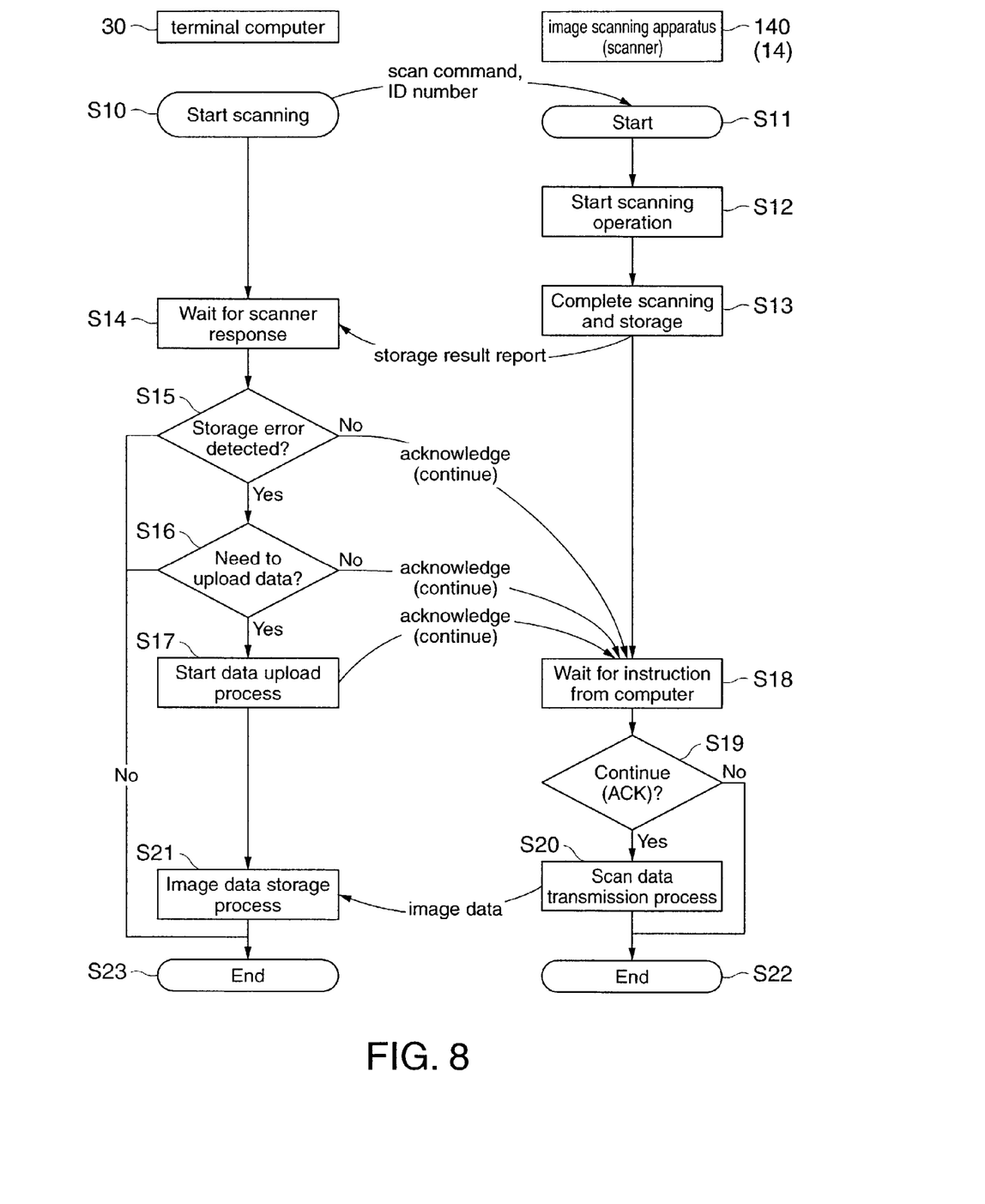
FIG. 8 is a flow chart showing an example of an image data transmission and processing method according to another embodiment of the present invention.

An alternative process is shown in FIG. 8. In this case, if a storage error is not reported (storage was completed successfully and S15 returns no) after the storage result report is received (S14), an acknowledge response to continue the process is sent to the scanner 14. In this case, the scanner 14 completes data storage and then proceeds to a scan data (image data) transmission process (i.e., uploading) (S19 returns yes, then S20). In the period from when scanning and storage to the storage memory 85 are completed (S13) to when data uploading is completed (S20), the "Storage OK" LED (L1) indicating storage was successful (see FIG. 7) lights steadily, and the "Uploading data" LED (L3) lights steadily from when the acknowledge response is sent (S18) until data uploading is finished (S20).

Likewise, if a storage error occurs (S15 returns yes) but uploading data is determined not necessary (S16 returns no), that is, if the data was successfully stored but some error occurred during the process, operation can also be configured so as to send an acknowledge response to continue the process. In this case the "Storage error" LED (L2) lights steady from when scanning and storage to the storage memory 85 are completed (S13) to when data uploading is completed (S20), and the "Uploading data" LED (L3) lights steady from when the acknowledge response is sent (S18) until data uploading is finished (S20).

By thus sending an acknowledge signal to the scanner 14 when S15 returns no or when S16 returns no as shown in FIG. 8, data can be stored to the storage memory 85 and uploaded to the terminal computer 30 with a single command. Furthermore, the image data can be redundantly stored in the storage memory 85 and terminal computer 30, and data security can be improved.

As described above, the image data transmission method and processing method of the present invention first store acquired image data in storage memory 85 and send the stored image data to the terminal computer 30 in response to a command therefrom. Image data can therefore be acquired quickly and sent reliably to the terminal computer 30 without depending upon the terminal computer 30 environment. Furthermore, because image data is processed according to the method determined by the terminal computer 30 based on a storage result report sent to the terminal computer 30 containing the result of storing the image data acquired by the scanner 14 to the storage memory 85, image data can be appropriately processed even when there is a problem with the storage memory 85, including a memory error or simply insufficient capacity.

As noted above, information about the data size of the stored image is contained in the storage result report, and based on the reported image data size the terminal computer 30 can also determine whether data uploading is necessary. If, for example, an upload command (acknowledge) is normally sent after the image data is successfully stored (S15 returns no) in order to improve data security, the data upload step could be skipped if the data size exceeds a predetermined limit. In this case data is not uploaded if much time will be needed for the upload step (such as when the image data is large), and the customer is not made to wait until check C processing ends. The "data size" in this case can be based on the number of dots (vertical and horizontal) in the image, the size of the image file, or the type of image file (i.e., compressed or not).

The storage result report can also be presented on the display of the terminal computer 30 instead of just using the indicator unit 42. This makes the storage result report easier for the user to understand, and also enables a more detailed report (including, for example, error content and data size information).

An electronic payment system 201 using a POS terminal 10 according to the present invention is described briefly next. As shown in FIG. 10 this electronic payment system 201 includes a user (customer terminal) 211, a store 212 (POS terminal 10) where check C is used, the check-issuing bank 213 where the user 211 has an account on which check C is drawn, a business account bank 214 where the store 212 has an account, and a clearing process server 215 where check C is cleared. The clearing process server 215 is connected to the user 211, store 212, check-issuing bank 213, and business account bank 214 by a network 220.

When a check C is presented to the store and the store has confirmed check C is valid, check information is generated and sent to the clearing process server 215. This check information includes the information read by the magnetic head 13 from the user-specific information 251, the amount 252 and store information 253 (including the store name, store code, bank account number, bank account title, address, and telephone number) input by the operator, and the image data acquired by the scanner 14 uniquely related.

The endorsement 255 (including the store name, store code, bank account number, bank account title, address, and telephone number) is also preferably transmitted with the acquired image data. This improves the usefulness of check C as proof of payment. The store information 253 printed to check C is preferably previously stored to the terminal computer 30 or hybrid processing apparatus 40 and printed at the same time the amount 252 is printed. This eliminates the need for the operator to input the store information 253 each time.

Based on the received check information (user-specific information 251, amount 252, store information 253, and image data), the clearing process server 215 completes the clearing (payment) process with the business account bank 214 and check-issuing bank 213. The clearing process server 215 can therefore batch acquire the data needed for payment, and does not need to extract the amount and payee (including the store name and store account number) information from the image data. The clearing process can therefore be completed more quickly.

The clearing process server 215 also acquires the check user contact information (mailing address) from the user-specific information 251, and based thereon sends information about check C processing to the user. This processing information includes the date check C was used, the check amount, payee information, settlement date, and an image of check C so that the user can confirm the payment.

An electronic payment system 201 according to the present invention thus eliminates the need to handle the actual check for check clearing and can complete the clearing process securely by sending and receiving check image data electronically. Furthermore, the clearing process server 215 can complete the clearing process quickly because it can batch acquire all information needed to complete payment.

As described above, because image data is processed according to the method determined by the terminal computer 30 based on a storage result report sent to the terminal computer 30 containing the result of storing the image data acquired by the scanner 14 to the storage memory 85, image data can be appropriately processed even when there is a problem with the storage memory 85, including a memory error or simply insufficient capacity, by means of the image data processing method, image scanning apparatus (hybrid processing apparatus 40), POS terminal 10, and electronic payment system 201 according to the present invention.

Furthermore, acquired image data is temporarily stored to a Work area (image data block) 84d before it is stored to the storage memory 85. Therefore, if the image data is not stored normally to the storage memory 85 the image data stored in the work area 84d can be sent directly to the terminal computer 30 without involving the storage memory 85. As a result, the image data can be reliably sent to the terminal computer 30 even when there is a problem with the storage memory 85.

Yet further, the clearing process server 215 of an electronic payment system 201 according to the present invention can also complete check Clearing process quickly based on check information sent from the POS terminal 10 because the check information contains all information needed for the clearing process (that is, user-specific information 251, amount 252, store information 253, and image data) uniquely related for quick check processing.

It should be noted that a storage error is reported when the remaining capacity of the storage memory 85 is insufficient to store the image data in the above example. It is also possible, however, to constantly monitor the remaining storage capacity and display an error whenever the remaining capacity drops below a defined threshold. This configuration enables the operator to confirm the remaining capacity before scanning the check so that, for example, the operator could recommend the customer use a different POS terminal 10 to improve customer service.

In this case an indicator for indicating the detected remaining storage capacity is preferably provided in the display of the hybrid processing apparatus 40 or on the display 33 of the terminal computer 30. This configuration enables the operator to constantly monitor how much memory is available in the storage memory 85 and confidently continue processing transactions.

The image data acquired by the scanner 14 (hybrid processing apparatus 40) in the present embodiments is data read from a personal check, bank check, or other such financial instrument. The invention is not so limited, however. Rather, the present invention can also be used for processing image data acquired from tickets and other documents, and sending the image data acquired therefrom to a host computer.

Additionally, the present invention is not limited to the system and device configurations described above. It will be apparent to one skilled in the related art from the disclosure herein that the invention can be modified in many ways without departing the scope of the accompanying claims.

When a problem, such as a device failure or insufficient storage capacity, occurs with the primary storage medium of an image scanning apparatus, the image data processing method, image scanning apparatus, POS terminal, and electronic payment system according to the present invention can continue to appropriately process the acquired image data.

While preferred embodiments of the invention have been described with reference to the drawings, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. An image data processing method for processing image data acquired by an image scanning apparatus according to commands issued by a host computer, the method comprising:

scanning image data using the image scanning apparatus;

attempting to store the image data in a primary storage medium in the image scanning apparatus;

sending a storage result report from the image scanning apparatus to the host computer, the storage result report being indicative of the result of storing the image data in the primary storage medium, the storage result report not including the image data acquired by the image scanning apparatus;

determining by the host computer a processing method to be performed on the image data based on the received storage result report; and processing the image data using the image scanning apparatus according to the determined processing method;

wherein the storage result report includes information indicating whether the image data was stored successfully in the primary storage medium; and wherein the image scanning apparatus comprises a temporary storage medium configured to temporarily store the acquired image data before an attempt is made to store it in the primary storage medium, and if a storage result report indicating that the image data was not stored successfully in the primary storage medium is received, then the processing method determined by the host computer includes a method for sending the image data stored in the temporary storage medium directly to the host computer without storing the image data in the primarily storage medium.

2. An image data processing method as described in claim 1, wherein, if a storage result report indicating that the image data was stored successfully is received, then the processing method determined by the host computer includes a method for completing the transaction.

3. An image data processing method as described in claim 2, wherein, if a storage result report indicating that the image data was stored successfully is received, then the processing method determined by the host computer includes a method for sending the image data stored in the primary storage medium to the host computer.

4. An image data processing method as described in claim 1, wherein, if a storage result report indicating that the image data was not stored successfully is received, then the processing method determined by the host computer includes a method for terminating the transaction.

5. An image data processing method as described in claim 1, wherein the storage result report includes information relating to the size of the stored image data.

6. An image data processing method as described in claim 1, further comprising presenting the storage result report.

7. An image data processing method as described in claim 6, wherein the image scanning apparatus comprises an indicator unit, and the presenting step comprises presenting the storage result report using the indicator unit.

8. An image data processing method as described in claim 6, wherein the host computer comprises a display device, and the presenting step comprises presenting the storage result report using the display device.

9. An image scanning apparatus for processing scanned image data according to commands issued by a host computer, comprising:
 a scanner configured to acquire image data;
 a primary storage medium configured to store the image data;
 a transmitting unit configured to send to the host computer a storage result report indicative of a result of storing the image data in the primary storage medium, the storage result report not including the image data acquired by the image scanning apparatus; and
 a processing unit configured to process the image data according to a processing mode determined by the host computer based on the storage result report;
 wherein the storage result report includes information indicating whether the image data was stored successfully in the primary storage medium; and
 a temporary storage medium configured to temporarily store the acquired image data before it is attempted to be stored in the primary storage medium; and
 wherein, if a storage result report indicating that the image data was not stored successfully in the primary storage medium is received, then the processing mode determined by the host computer includes sending the image data stored in the temporary storage medium directly to the host computer without storing the image data in the primary storage medium.

10. An image scanning apparatus as described in claim 9, wherein, if a storage result report indicating that the image data was stored successfully is received, then the processing mode determined by the host computer includes completing the transaction.

11. An image scanning apparatus as described in claim 10, wherein, if a storage result report indicating that the image data was stored successfully is received, then the processing mode determined by the host computer includes sending the image data stored in the primary storage medium to the host computer.

12. An image scanning apparatus as described in claim 9, wherein, if a storage result report indicating that the image data was not stored successfully is received, then the processing mode determined by the host computer includes terminating the transaction.

13. An image scanning apparatus as described in claim 9, wherein the storage result report includes information relating to the size of the stored image data.

14. A POS terminal, comprising:
 an image scanning apparatus comprising
  a scanner configured to acquire image data,
  a primary storage medium configured to store the image data,
  a transmitting unit configured to send to a host computer a storage result report indicative of a result of storing the image data in the primary storage medium, the storage result report not including the image data acquired by the image scanning apparatus, and
  a processing unit configured to process the image data according to a processing mode determined by the host computer based on the storage result report;
 wherein the storage result report includes information indicating whether the image data was stored successfully in the primary storage medium;
 a temporary storage medium configured to temporarily store the acquired image data before it is attempted to be stored in the primary storage medium; and
 wherein, if a storage result report indicating that the image data was not stored successfully in the primary storage medium is received, then the processing mode determined by the host computer includes sending the image data stored in the temporary storage medium directly to the host computer without storing the image data n the primary storage medium; and
 a terminal computer functioning as the host computer.

15. A POS terminal as described in claim 14, further comprising:
 a user-specific information reader configured to acquire user-specific information preprinted on the check; and
 a transmitter configured to send the acquired user-specific information to the terminal computer;
 wherein the terminal computer stores the sent image data and the user-specific information from the image data linked to each other.

16. An electronic payment system, comprising:
 a POS terminal comprising
  an image scanning apparatus comprising
   a scanner configured to acquire image data,
   a primary storage medium configured to store the image data,
   a transmitting unit configured to send to a host computer a storage result report indicative of a result of storing the image data in the primary storage medium, the storage result report not including the image data acquired by the image scanning apparatus, and
   a processing unit configured to process the image data according to a processing mode determined by the host computer based on the storage result report,
  wherein the storage result report includes information indicating whether the image data was stored success full in the primary storage medium;
  a temporary storage medium configured to temporarily store the acquired image data before it is attempted to be stored in the primary storage medium; and
  wherein, if a storage result report indicating that the image data was not stored successfully in the primary storage medium is received, then the processing mode determined by the host computer includes sending the image data stored in the temporary storage medium directly to the host computer without storing the image data in the primary storage medium; and
 a terminal computer functioning as the host computer;
 a customer terminal used by a check user; and
 a clearing process server connected through a network to the POS terminal and customer terminal for executing and managing a check payment clearing process.

* * * * *